United States Patent
Lee

(10) Patent No.: US 8,452,051 B1
(45) Date of Patent: May 28, 2013

(54) HAND-LOCATION POST-PROCESS REFINEMENT IN A TRACKING SYSTEM

(71) Applicant: Microsoft Corporation, Redmond, WA (US)

(72) Inventor: Johnny Chung Lee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/718,494

(22) Filed: Dec. 18, 2012

Related U.S. Application Data

(62) Division of application No. 12/767,126, filed on Apr. 26, 2010, now Pat. No. 8,351,651.

(51) Int. Cl.
*G06K 9/62* (2006.01)

(52) U.S. Cl.
USPC ............ 382/103; 382/154; 382/291; 715/863

(58) Field of Classification Search
None
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |

(Continued)

FOREIGN PATENT DOCUMENTS

| | | |
|---|---|---|
| CN | 101254344 B | 6/2010 |
| EP | 0583061 A2 | 2/1994 |

(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

(Continued)

*Primary Examiner* — Brian P Werner
(74) *Attorney, Agent, or Firm* — Vierra Magen Marcus LLP

(57) ABSTRACT

A tracking system having a depth camera tracks a user's body in a physical space and derives a model of the body, including an initial estimate of a hand position. Temporal smoothing is performed in which some latency is imposed when the initial estimate moves by less than a threshold level from frame to frame, while little or no latency is imposed when the movement is more than the threshold. The smoothed estimate is used to define a local volume for searching for a hand extremity to define a new hand position. Another process generates stabilized upper body points that can be used as reliable reference positions, such as by detecting and accounting for occlusions. The upper body points and a prior estimated hand position are used to define an arm vector. A search is made along the vector to detect a hand extremity to define a new hand position.

20 Claims, 12 Drawing Sheets

U.S. PATENT DOCUMENTS

| | | | |
|---|---|---|---|
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,802,220 A | 9/1998 | Black et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A * | 10/2000 | Smith et al. .................. 345/157 |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,819,782 B1 * | 11/2004 | Imagawa et al. .................. 382/115 |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,129,927 B2 | 10/2006 | Mattsson |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,274,800 B2 | 9/2007 | Nefian et al. |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 * | 6/2009 | Hildreth et al. .................. 382/103 |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |

| | | | |
|---|---|---|---|
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 * | 3/2011 | Hildreth et al. ............... 345/156 |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2007/0189627 | A1 | 8/2007 | Cohen et al. |
| 2008/0026838 | A1 | 1/2008 | Dunstan et al. |
| 2008/0212836 | A1 * | 9/2008 | Fujimura et al. ............. 382/103 |
| 2008/0226189 | A1 | 9/2008 | Connell |
| 2009/0274339 | A9 * | 11/2009 | Cohen et al. .................. 382/103 |
| 2010/0111358 | A1 * | 5/2010 | Chai et al. ..................... 382/103 |
| 2010/0146464 | A1 * | 6/2010 | Wilson et al. ................. 715/863 |
| 2010/0166258 | A1 * | 7/2010 | Chai et al. ..................... 382/103 |
| 2011/0211754 | A1 * | 9/2011 | Litvak et al. .................. 382/165 |
| 2011/0262002 | A1 | 10/2011 | Lee |
| 2011/0267258 | A1 * | 11/2011 | Wang et al. ................... 345/156 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/ Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

Wang, "Human Body Posture Refinement by Nonparametric Belief Propagation," appears in IEEE International Conference on Image Processing, Sep. 2005, vol. 3, Singapore.

Lu, "Using Multiple Cues for Hand Tracking and Model Refinement," IEEE Computer Society Conference on Computer Vision and Pattern Recognition, Jun. 2003, 8 pages, vol. 2.

Sudderth, "Visual Hand Tracking Using Nonparametric Belief Propagation," MIT Laboratory for Information & Decision Systems Technical Report P-2603, Presented at the 2004 IEEE CVPR Workshop on Generative Model Based Vision, May 2004, IEEE Computer Society, Washington, DC, USA.

Toyama, Kentaro, et al., "Probabilistic Tracking in a Metric Space," Eighth International Conference on Computer Vision, Vancouver, Canada, vol. 2, Jul. 2001, 8 pages.

Restriction Requirement dated Aug. 8, 2012, U.S. Appl. No. 12/767,126, filed Apr. 26, 2010.

Response to Restriction Requirement dated Aug. 21, 2012, U.S. Appl. No. 12/767,126, filed Apr. 26, 2010.

Notice of Allowance and Fee(s) Due dated Sep. 7, 2012, U.S. Appl. No. 12/767,126, filed Apr. 26, 2010.

Chinese Office Action dated Mar. 14, 2013, Chinese Patent Application No. 201110112869.2.

Office Action dated Mar. 28, 2013, Chinese Patent Application No. 201110112867.2.

English Summary of Response to Office Action and Claims Amendment (Marked-up & Clean Copies) dated Mar. 28, 2013, Chinese Patent Application No. 201110112867.2.

\* cited by examiner

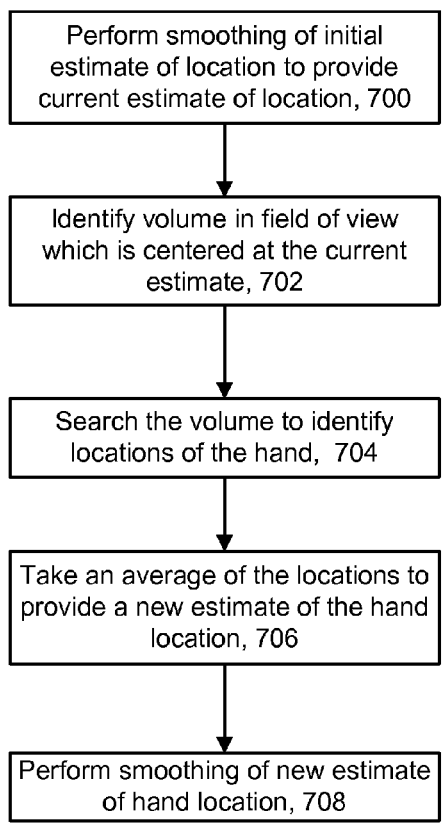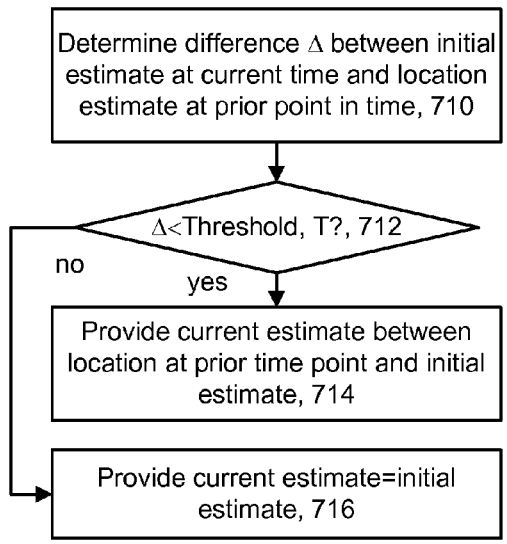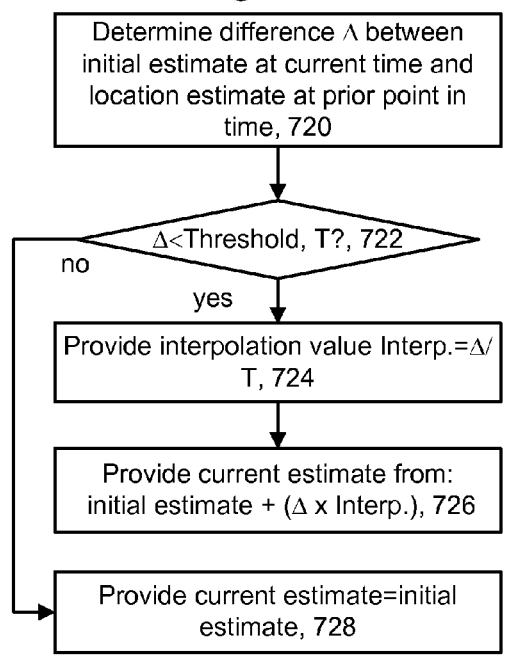

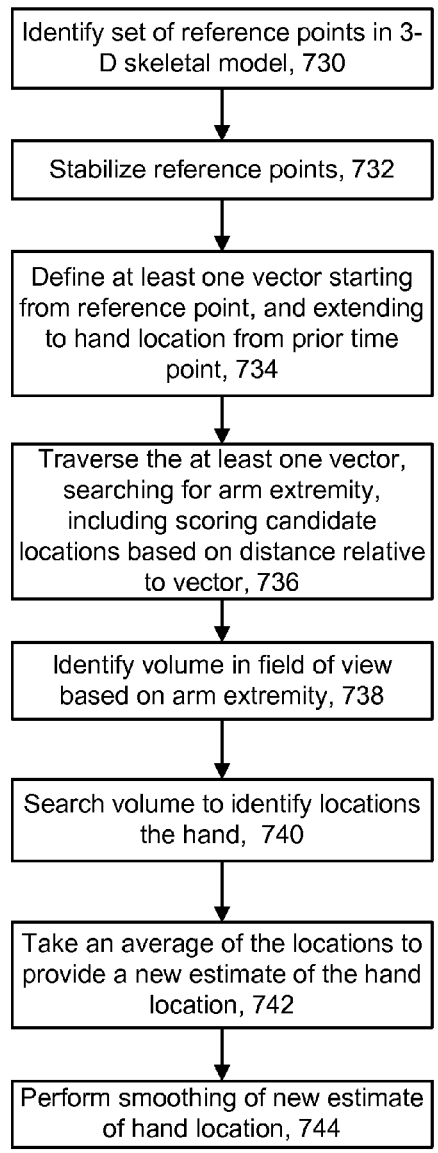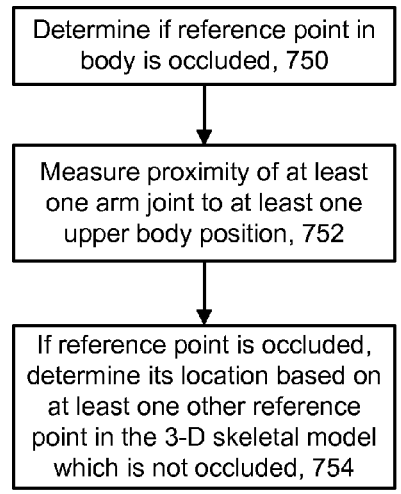

HAND-LOCATION POST-PROCESS REFINEMENT IN A TRACKING SYSTEM

CROSS-REFERENCE TO RELATED APPLICATIONS

This is a divisional application of U.S. patent application Ser. No. 12/767,126, entitled "Hand-Location Post-Process Refinement In A Tracking System," by Johnny Chung Lee, filed Apr. 26, 2010, published as US2011/0262002 on Oct. 27, 2011 and issued as U.S. Pat. No. 8,351,651 on Jan. 8, 2013, and incorporated by reference herein in its entirety.

BACKGROUND

Motion capture systems obtain data regarding the location and movement of a human or other subject in a physical space, and can use the data as an input to an application in a computing system. Many applications are possible, such as for military, entertainment, sports and medical purposes. For instance, the motion of humans can be mapped to a three-dimensional (3-D) human skeletal model and used to create an animated character or avatar. Motion capture systems can include optical systems, including those using visible and invisible, e.g., infrared, light, which use cameras to detect the presence of a human in a field of view. However, further refinements are needed in tracking a human with higher fidelity. In particular, it is desirable to track a person's hand with a high degree of fidelity.

SUMMARY

A processor-implemented method, motion capture system and tangible computer readable storage are provided for tracking a user's hand with improved fidelity in a motion capture system. For example, the user may make hand gestures to navigate a menu, interact in a browsing or shopping experience, choose a game to play, or access communication features such as sending a message to a friend. The user may use the hand to control a cursor to select an item from an on-screen menu, or to control the movement of an avatar in a 3-D virtual world. Generally, the hand location can be tracked and used as a control input to an application in a motion capture system.

To enhance the ability of the motion capture system to accurately identify the hand location, a number of different techniques are provided. These techniques generally start with an initial estimate of a hand location and refine that estimate. Problems such as jitter, limited camera resolution, camera noise, and occluded body parts are addressed.

In one embodiment, a processor-implemented method for tracking user movement in a motion capture system is provided. The method includes tracking a user's hand in a field of view of the motion capture system over time, including obtaining a 3-D depth image of the hand at different points in time. The 3-D depth image may be used to provide a skeletal model of the user's body, for instance. The method further includes obtaining an initial estimate of a location of the hand in the field of view based on the tracking. The initial estimate can be provided by any type of motion tracking system. The initial estimate of the location may be somewhat inaccurate due to errors which may be introduced by the motion tracking system, including noise, jitter and the tracking algorithm used. The method further includes determining a difference of the initial estimate relative to a corresponding estimate of a prior point in time, and determining if the difference is less than a threshold. The threshold may define a 2-D area or a 3-D volume which has the estimate of the prior point in time as its center. If the difference is less than the threshold, a smoothing process applied to the initial estimate to provide a current estimate of the location by changing the initial estimate by an amount which is less than the difference.

On the other hand, if the difference is relatively large so that it is not less than the threshold, the current estimate of the location can be provided substantially as the initial estimate. In this case, no smoothing effect is applied. This technique minimizes latency for large frame-to-frame movements of the hand, while smoothing smaller movements. Based on the current estimate, a volume is defined in the field of view, such as a rectangular (including cubic) or spherical volume, as a search volume. The 3-D depth image is searched in the volume to determine a new estimate of a location of the hand in the field of view. This searching can include identifying locations of edges of the hand in the volume and determining an average of the locations of the edges. The method further includes providing a control input to an application which represents the hand in the field of view based, at least in part, on the new estimate of the location, or a value derived from the new estimate of the location. This control input can be used for navigating a menu, controlling movement of an avatar and so forth.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

In the drawings, like-numbered elements correspond to one another.

FIG. 7A depicts an example method for updating a hand location as set forth in step 504 of FIG. 5.

FIG. 7B depicts an example method for performing smoothing as set forth in step 700 of FIG. 7A.

FIG. 7C depicts another example method for performing smoothing as set forth in step 700 of FIG. 7A.

FIG. 7D depicts an example method for updating a hand location as set forth in step 504 of FIG. 5.

FIG. 7E depicts an example method for stabilizing reference points of a model as set forth in step 732 of FIG. 7D.

DETAILED DESCRIPTION

Techniques are provided for more accurately identifying the position of a hand in a motion tracking system. The techniques can be extended to tracking of other body parts such as the foot or head, or to non-body part objects. Generally, a depth camera system can track the movement of a user's body in a physical space and derive a model of the body, which is updated for each camera frame, several times per second. However, it is often necessary to identify the user's hands with a high degree of fidelity. But, tracking systems which are optimized for full body tracking may lack the ability to track the hands with sufficiently high accuracy. Such systems may provide coarse and potentially unstable guesses for the hand location. Techniques provided herein refine an initial estimate of a hand position which may be generated by an external human tracking system. The techniques include post processing steps that analyze local regions in a depth image, generate stabilized upper body points that can be used as reliable reference positions, search through the depth image for hand extremities, and perform temporal smoothing in a manner that minimizes perceptual latency.

Figure 1:
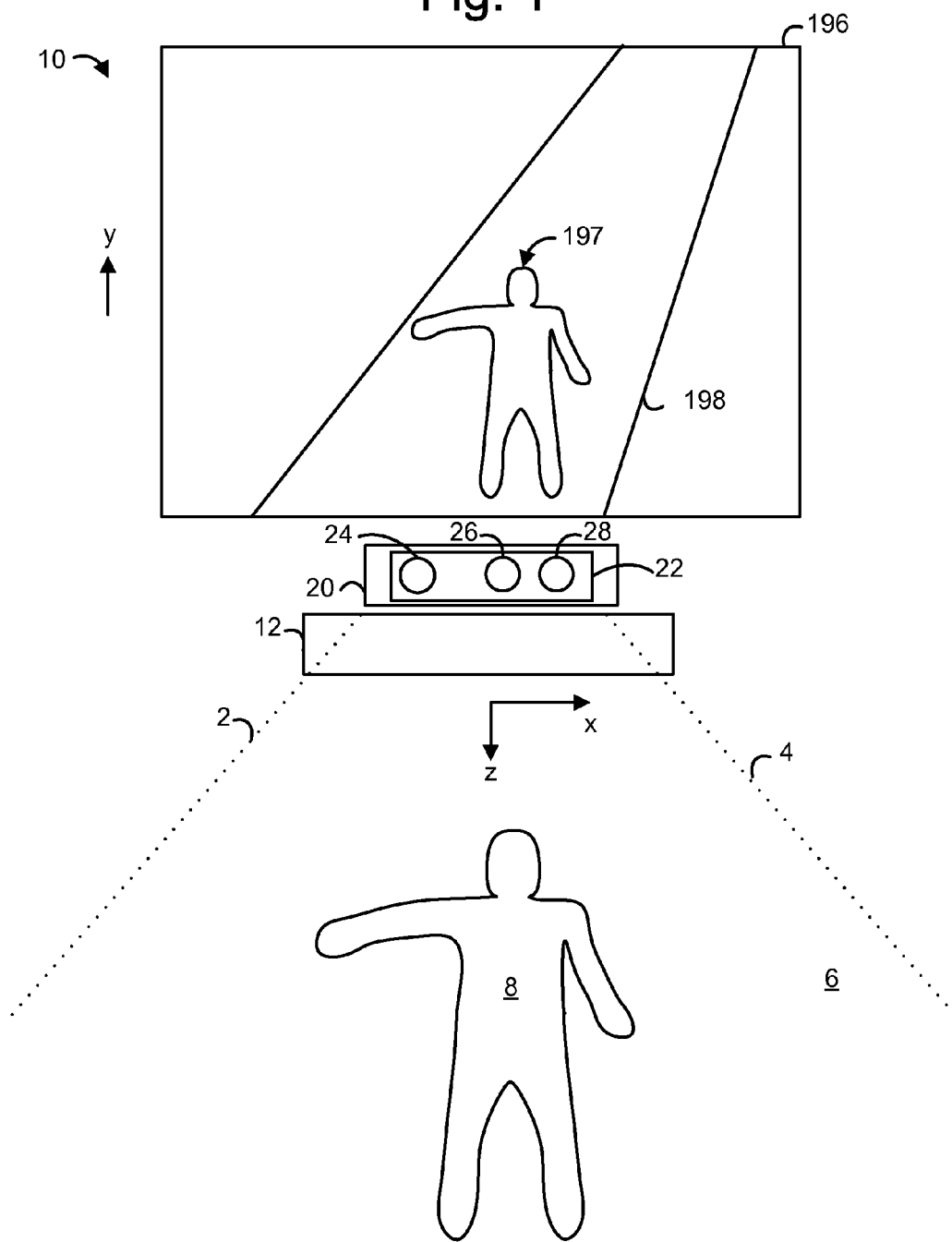
FIG. 1 depicts an example embodiment of a motion capture system.

FIG. 1 depicts an example embodiment of a motion capture system 10 in which a person 8 interacts with an application. This illustrates the real world deployment of a motion capture system, such as in the home of a user. The motion capture system 10 includes a display 196, a depth camera system 20, and a computing environment or apparatus 12. The depth camera system 20 may include an image camera component 22 having an infrared (IR) light emitter 24, an infrared camera 26 and a red-green-blue (RGB) camera 28. A user 8, also referred to as a person or player, stands in a field of view 6 of the depth camera. Lines 2 and 4 denote a boundary of the field of view 6. In this example, the depth camera system 20, and computing environment 12 provide an application in which an avatar 197 on the display 196 track the movements of the user 8. For example, the avatar may raise an arm when the user raises an arm. The avatar 197 is standing on a road 198 in a 3-D virtual world. A Cartesian world coordinate system may be defined which includes a z-axis which extends along the focal length of the depth camera system 20, e.g., horizontally, a y-axis which extends vertically, and an x-axis which extends laterally and horizontally. Note that the perspective of the drawing is modified as a simplification, as the display 196 extends vertically in the y-axis direction and the z-axis extends out from the depth camera system, perpendicular to the y-axis and the x-axis, and parallel to a ground surface on which the user 8 stands.

Generally, the motion capture system 10 is used to recognize, analyze, and/or track a human target. The computing environment 12 can include a computer, a gaming system or console, or the like, as well as hardware components and/or software components to execute applications.

The depth camera system 20 may include a camera which is used to visually monitor one or more people, such as the user 8, such that gestures and/or movements performed by the user may be captured, analyzed, and tracked to perform one or more controls or actions within an application, such as animating an avatar or on-screen character or selecting a menu item in a user interface (UI).

The motion capture system 10 may be connected to an audiovisual device such as the display 196, e.g., a television, a monitor, a high-definition television (HDTV), or the like, or even a projection on a wall or other surface that provides a visual and audio output to the user. An audio output can also be provided via a separate device. To drive the display, the computing environment 12 may include a video adapter such as a graphics card and/or an audio adapter such as a sound card that provides audiovisual signals associated with an application. The display 196 may be connected to the computing environment 12 via, for example, an S-Video cable, a coaxial cable, an HDMI cable, a DVI cable, a VGA cable, or the like.

The user 8 may be tracked using the depth camera system 20 such that the gestures and/or movements of the user are captured and used to animate an avatar or on-screen character and/or interpreted as input controls to the application being executed by computer environment 12.

Some movements of the user 8 may be interpreted as controls that may correspond to actions other than controlling an avatar. For example, in one embodiment, the player may use movements to end, pause, or save a game, select a level, view high scores, communicate with a friend, and so forth. The player may use movements to select the game or other application from a main user interface, or to otherwise navigate a menu of options. Thus, a full range of motion of the user 8 may be available, used, and analyzed in any suitable manner to interact with an application.

The person can hold an object such as a prop when interacting with an application. In such embodiments, the movement of the person and the object may be used to control an application. For example, the motion of a player holding a racket may be tracked and used for controlling an on-screen racket in an application which simulates a tennis game. In another example embodiment, the motion of a player holding a toy weapon such as a plastic sword may be tracked and used for controlling a corresponding weapon in the virtual world of an application which provides a pirate ship.

The motion capture system 10 may further be used to interpret target movements as operating system and/or application controls that are outside the realm of games and other applications which are meant for entertainment and leisure. For example, virtually any controllable aspect of an operating system and/or application may be controlled by movements of the user 8.

Figure 2:
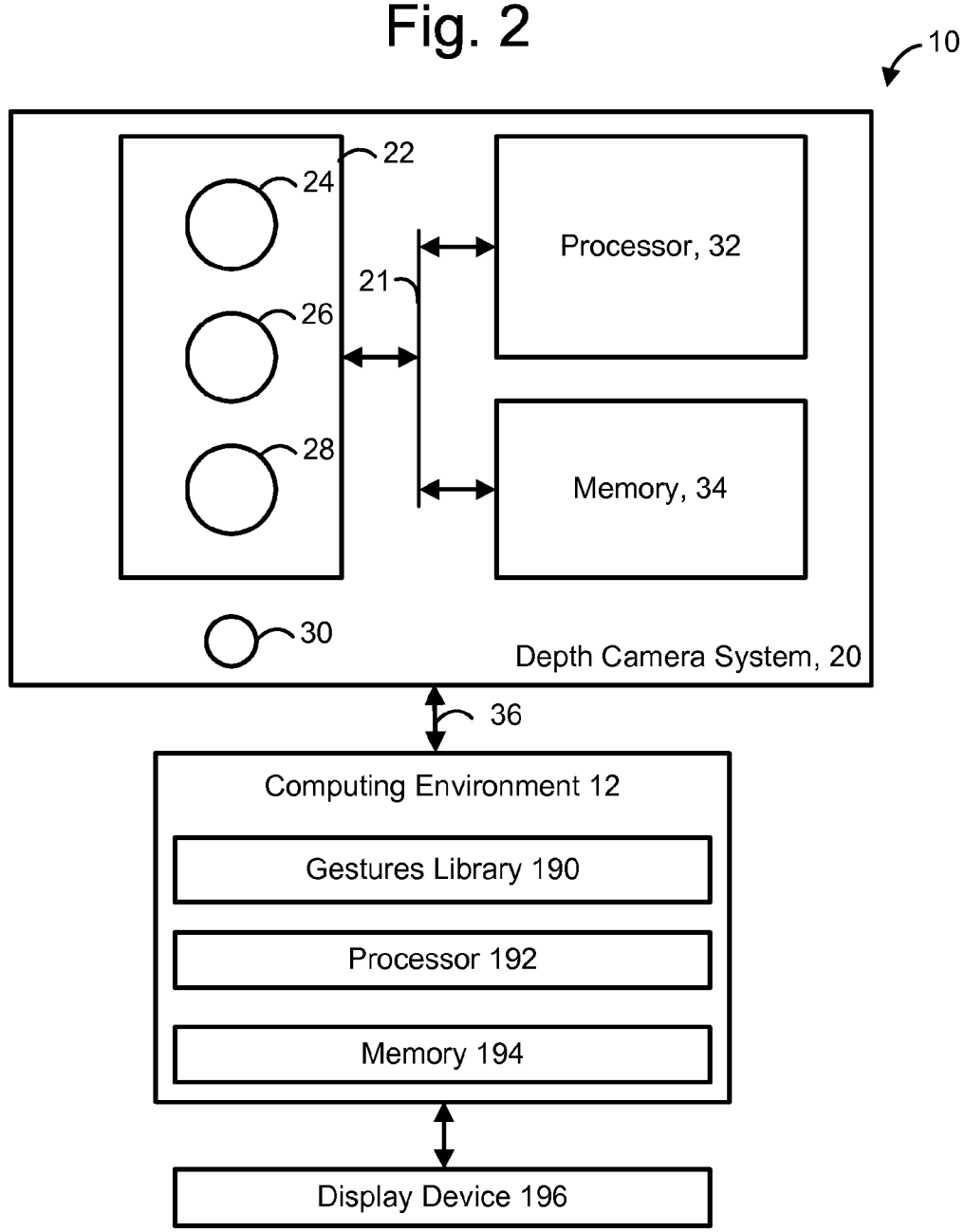
FIG. 2 depicts an example block diagram of the motion capture system of FIG. 1.

FIG. 2 depicts an example block diagram of the motion capture system 10 of FIG. 1a. The depth camera system 20 may be configured to capture video with depth information including a depth image that may include depth values, via any suitable technique including, for example, time-of-flight, structured light, stereo image, or the like. The depth camera system 20 may organize the depth information into "Z layers," or layers that may be perpendicular to a Z axis extending from the depth camera along its line of sight.

The depth camera system 20 may include an image camera component 22, such as a depth camera that captures the depth image of a scene in a physical space. The depth image may include a two-dimensional (2-D) pixel area of the captured scene, where each pixel in the 2-D pixel area has an associated depth value which represents a linear distance from the image camera component 22.

The image camera component 22 may include an infrared (IR) light emitter 24, an infrared camera 26, and a red-green-blue (RGB) camera 28 that may be used to capture the depth image of a scene. A 3-D camera is formed by the combination of the infrared emitter 24 and the infrared camera 26. For example, in time-of-flight analysis, the IR light emitter 24 emits infrared light onto the physical space and the infrared camera 26 detects the backscattered light from the surface of one or more targets and objects in the physical space. In some embodiments, pulsed infrared light may be used such that the time between an outgoing light pulse and a corresponding incoming light pulse is measured and used to determine a physical distance from the depth camera system 20 to a particular location on the targets or objects in the physical space. The phase of the outgoing light wave may be compared to the phase of the incoming light wave to determine a phase shift. The phase shift may then be used to determine a physical distance from the depth camera system to a particular location on the targets or objects.

A time-of-flight analysis may also be used to indirectly determine a physical distance from the depth camera system 20 to a particular location on the targets or objects by analyzing the intensity of the reflected beam of light over time via various techniques including, for example, shuttered light pulse imaging.

In another example embodiment, the depth camera system 20 may use a structured light to capture depth information. In such an analysis, patterned light (i.e., light displayed as a known pattern such as grid pattern or a stripe pattern) may be projected onto the scene via, for example, the IR light emitter 24. Upon striking the surface of one or more targets or objects in the scene, the pattern may become deformed in response. Such a deformation of the pattern may be captured by, for example, the infrared camera 26 and/or the RGB camera 28 and may then be analyzed to determine a physical distance from the depth camera system to a particular location on the targets or objects.

The depth camera system 20 may include two or more physically separated cameras that may view a scene from different angles to obtain visual stereo data that may be resolved to generate depth information.

The depth camera system 20 may further include a microphone 30 which includes, e.g., a transducer or sensor that receives and converts sound waves into an electrical signal. Additionally, the microphone 30 may be used to receive audio signals such as sounds that are provided by a person to control an application that is run by the computing environment 12. The audio signals can include vocal sounds of the person such as spoken words, whistling, shouts and other utterances as well as non-vocal sounds such as clapping hands or stomping feet.

The depth camera system 20 may include a processor 32 that is in communication with the image camera component 22. The processor 32 may include a standardized processor, a specialized processor, a microprocessor, or the like that may execute instructions including, for example, instructions for receiving a depth image; generating a grid of voxels based on the depth image; removing a background included in the grid of voxels to isolate one or more voxels associated with a human target; determining a location or position of one or more extremities of the isolated human target; adjusting a model based on the location or position of the one or more extremities, or any other suitable instruction, which will be described in more detail below.

The depth camera system 20 may further include a memory component 34 that may store instructions that are executed by the processor 32, as well as storing images or frames of images captured by the 3-D camera or RGB camera, or any other suitable information, images, or the like. According to an example embodiment, the memory component 34 may include random access memory (RAM), read only memory (ROM), cache, flash memory, a hard disk, or any other suitable tangible computer readable storage component. The memory component 34 may be a separate component in communication with the image capture component 22 and the processor 32 via a bus 21. According to another embodiment, the memory component 34 may be integrated into the processor 32 and/or the image capture component 22.

The depth camera system 20 may be in communication with the computing environment 12 via a communication link 36. The communication link 36 may be a wired and/or a wireless connection. According to one embodiment, the computing environment 12 may provide a clock signal to the depth camera system 20 via the communication link 36 that indicates when to capture image data from the physical space which is in the field of view of the depth camera system 20.

Additionally, the depth camera system 20 may provide the depth information and images captured by, for example, the 3-D camera 26 and/or the RGB camera 28, and/or a skeletal model that may be generated by the depth camera system 20 to the computing environment 12 via the communication link 36. The computing environment 12 may then use the model, depth information, and captured images to control an application. For example, as shown in FIG. 2, the computing environment 12 may include a gestures library 190, such as a collection of gesture filters, each having information concerning a gesture that may be performed by the skeletal model (as the user moves). For example, a gesture filter can be provided for various hand gestures, such as swiping or flinging of the hands. By comparing a detected motion to each filter, a specified gesture or movement which is performed by a person can be identified. An extent to which the movement is performed can also be determined.

The data captured by the depth camera system 20 in the form of the skeletal model and movements associated with it may be compared to the gesture filters in the gesture library 190 to identify when a user (as represented by the skeletal model) has performed one or more specific movements. Those movements may be associated with various controls of an application.

The computing environment may also include a processor 192 for executing instructions which are stored in a memory 194 to provide audio-video output signals to the display device 196 and to achieve other functionality as described herein.

Figure 3:
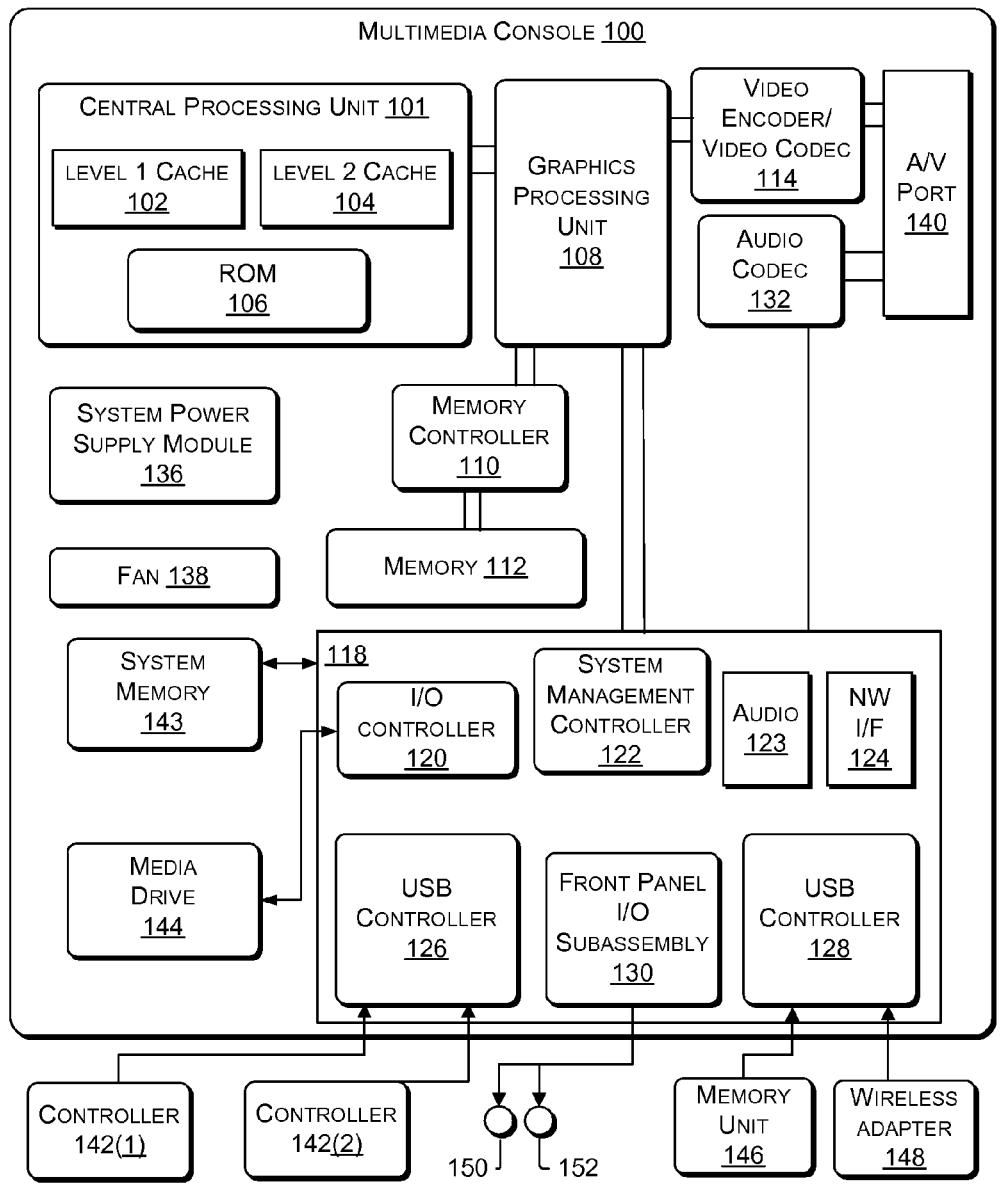
FIG. 3 depicts an example block diagram of a computing environment that may be used in the motion capture system of FIG. 1.

FIG. 3 depicts an example block diagram of a computing environment that may be used in the motion capture system of FIG. 1. The computing environment can be used to interpret one or more gestures or other movements and, in response, update a visual space on a display. The computing environment such as the computing environment 12 described above may include a multimedia console 100, such as a gaming console. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The memory 106 such as flash ROM may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as RAM (Random Access Memory).

The multimedia console 100 includes an I/O controller 120, a system management controller 122, an audio processing unit 123, a network interface 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface (NW IF) 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection.

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered on, a specified amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The console 100 may receive additional inputs from the depth camera system 20 of FIG. 2, including the cameras 26 and 28.

Figure 4:
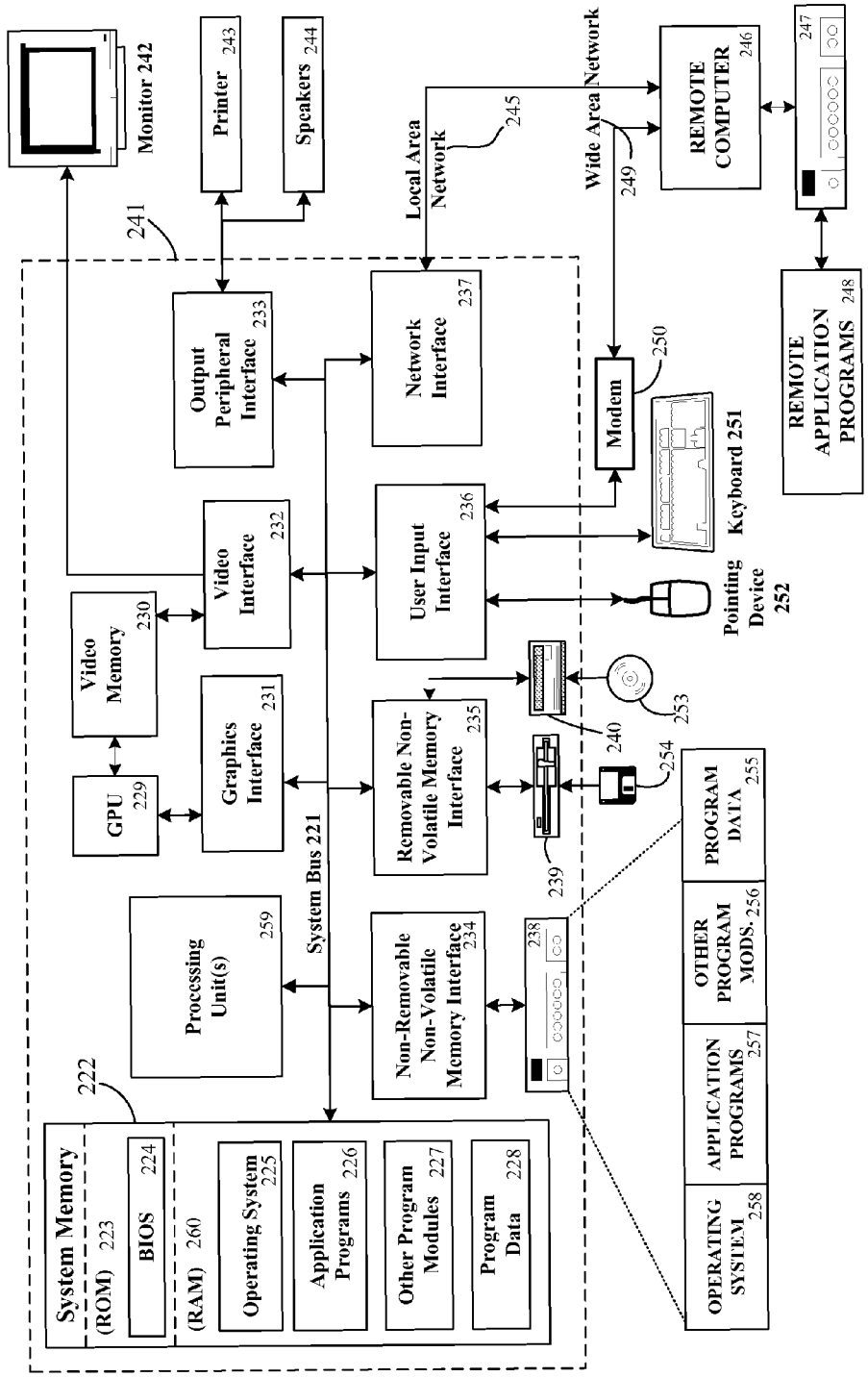
FIG. 4 depicts another example block diagram of a computing environment that may be used in the motion capture system of FIG. 1.

FIG. 4 depicts another example block diagram of a computing environment that may be used in the motion capture system of FIG. 1.

In a motion capture system, the computing environment can be used to interpret one or more gestures or other movements and, in response, update a visual space on a display. The computing environment 220 comprises a computer 241, which typically includes a variety of tangible computer readable storage media. This can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. A graphics interface 231 communicates with a GPU 229. By way of example, and not limitation, FIG. 4 depicts operating system 225, application programs 226, other program modules 227, and program data 228.

The computer 241 may also include other removable/non-removable, volatile/nonvolatile computer storage media, e.g., a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile tangible computer readable storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and depicted in FIG. 4, provide storage of computer readable instructions, data structures, program modules and other data for the computer 241. For example, hard disk drive 238 is depicted as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to depict that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The depth camera system 20 of FIG. 2, including cameras 26 and 28, may define additional input devices for the console 100. A monitor 242 or other type of display is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been depicted in FIG. 4. The logical connections include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 depicts remote application programs 248 as residing on memory device 247. It will be appreciated that the network connections shown are exemplary and other means of establishing a communications link between the computers may be used.

The computing environment can include tangible computer readable storage having computer readable software embodied thereon for programming at least one processor to perform a method for generating proxy training data for human body tracking as described herein. The tangible computer readable storage can include, e.g., one or more of components 222, 234, 235, 230, 253 and 254. Further, one or more processors of the computing environment can provide a processor-implemented method for generating proxy training data for human body tracking, comprising processor-implemented steps as described herein. A processor can include, e.g., one or more of components 229 and 259.

Figure 5:
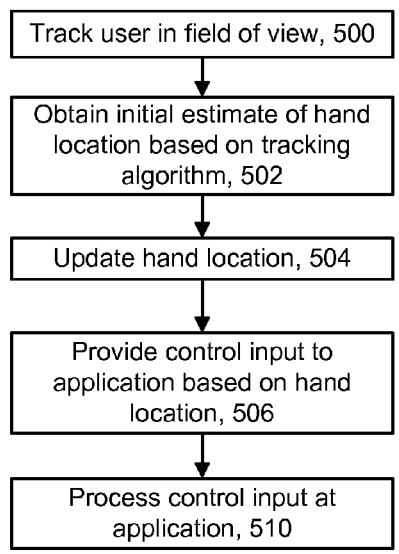
FIG. 5 depicts a method for tracking a user's hand with improved fidelity in a motion capture system.

FIG. 5 depicts a method for tracking a user's hand with improved fidelity in a motion capture system. Step 500 includes tracking a user in a field of view of a depth camera system. For further details, see, e.g., FIG. 6. Step 502 includes obtaining an initial estimate of a hand location based on a tracking algorithm. Note that the process described refers to a single hand, but the process can be adapted for use in determining the location of a second hand of a given person, or, generally, for one or more hands of one or more people in the field of view. The initial estimate can be obtained from the user tracking such as described in connection with FIG. 6. Step 504 includes updating the hand location. For further details, see, e.g., FIGS. 7A and 7D. Step 506 includes providing a control input to an application based on the hand location.

The input can represent the position of a user's hand, for instance, in terms of a point location in the field of view, as expressed by (x, y, z) coordinates in a Cartesian coordinate system, for instance. FIG. 1 provided an example of a Cartesian coordinate system. Step 510 includes processing the control input at the application. This can involve, e.g., updating a display based on the user's hand movement, for instance, launching a game application, or performing any number of other actions.

Figure 6:
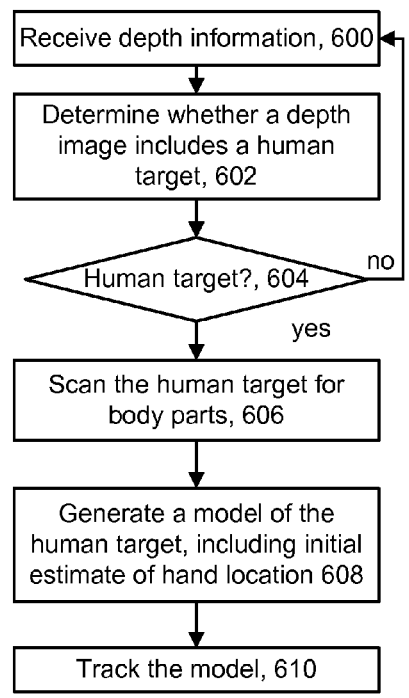
FIG. 6 depicts an example method for tracking movement of a person as set forth in step 500 of FIG. 5.

FIG. 6 depicts an example method for tracking movement of a person as set forth in step 500 of FIG. 5. The example method may be implemented using, for example, the depth camera system 20 and/or the computing environment 12, 100 or 220 as discussed in connection with FIGS. 2-4. One or more people can be scanned to generate a model such as a skeletal model, a mesh human model, or any other suitable representation of a person. In a skeletal model, each body part may be characterized as a mathematical vector defining joints and bones of the skeletal model. Body parts can move relative to one another at the joints.

The model may then be used to interact with an application that is executed by the computing environment. The scan to generate the model can occur when an application is started or launched, or at other times as controlled by the application of the scanned person.

The person may be scanned to generate a skeletal model that may be tracked such that physical movements or motions of the user may act as a real-time user interface that adjusts and/or controls parameters of an application. For example, the tracked movements of a person may be used to move an avatar or other on-screen character in an electronic role-playing game; to control an on-screen vehicle in an electronic racing game; to control the building or organization of objects in a virtual environment; or to perform any other suitable control of an application.

According to one embodiment, at step 600, depth information is received, e.g., from the depth camera system. The depth camera system may capture or observe a field of view that may include one or more targets. In an example embodiment, the depth camera system may obtain depth information associated with the one or more targets in the capture area using any suitable technique such as time-of-flight analysis, structured light analysis, stereo vision analysis, or the like, as discussed. The depth information may include a depth image or map having a plurality of observed pixels, where each observed pixel has an observed depth value, as discussed.

The depth image may be downsampled to a lower processing resolution so that it can be more easily used and processed with less computing overhead. Additionally, one or more high-variance and/or noisy depth values may be removed and/or smoothed from the depth image; portions of missing and/or removed depth information may be filled in and/or reconstructed; and/or any other suitable processing may be performed on the received depth information such that the depth information may used to generate a model such as a skeletal model, discussed also in connection with FIG. 8.

At decision step 604, a determination is made as to whether the depth image includes a human target. This can include flood filling each target or object in the depth image comparing each target or object to a pattern to determine whether the depth image includes a human target. For example, various depth values of pixels in a selected area or point of the depth image may be compared to determine edges that may define targets or objects as described above. The likely Z values of the Z layers may be flood filled based on the determined edges. For example, the pixels associated with the determined edges and the pixels of the area within the edges may be associated with each other to define a target or an object in the capture area that may be compared with a pattern, which will be described in more detail below.

If decision step 604 is true, step 606 is performed. If decision step 604 is false, additional depth information is received at step 600.

The pattern to which each target or object is compared may include one or more data structures having a set of variables that collectively define a typical body of a human. Information associated with the pixels of, for example, a human target and a non-human target in the field of view, may be compared with the variables to identify a human target. In one embodiment, each of the variables in the set may be weighted based on a body part. For example, various body parts such as a head and/or shoulders in the pattern may have weight value associated therewith that may be greater than other body parts such as a leg. According to one embodiment, the weight values may be used when comparing a target with the variables to determine whether and which of the targets may be human. For example, matches between the variables and the target that have larger weight values may yield a greater likelihood of the target being human than matches with smaller weight values.

Step 606 includes scanning the human target for body parts. The human target may be scanned to provide measurements such as length, width, or the like associated with one or more body parts of a person to provide an accurate model of the person. In an example embodiment, the human target may be isolated and a bitmask of the human target may be created to scan for one or more body parts. The bitmask may be created by, for example, flood filling the human target such that the human target may be separated from other targets or objects in the capture area elements. The bitmask may then be analyzed for one or more body parts to generate a model such as a skeletal model, a mesh human model, or the like of the human target. For example, according to one embodiment, measurement values determined by the scanned bitmask may be used to define one or more joints in a skeletal model. The one or more joints may be used to define one or more bones that may correspond to a body part of a human.

For example, the top of the bitmask of the human target may be associated with a location of the top of the head. After determining the top of the head, the bitmask may be scanned downward to then determine a location of a neck, a location of the shoulders and so forth. A width of the bitmask, for example, at a position being scanned, may be compared to a threshold value of a typical width associated with, for example, a neck, shoulders, or the like. In an alternative embodiment, the distance from a previous position scanned and associated with a body part in a bitmask may be used to determine the location of the neck, shoulders or the like. Some body parts such as legs, feet, or the like may be calculated based on, for example, the location of other body parts. Upon determining the values of a body part, a data structure is created that includes measurement values of the body part. The data structure may include scan results averaged from multiple depth images which are provide at different points in time by the depth camera system.

Step 608 includes generating a model of the human target, including an initial estimate of a hand location. In one embodiment, measurement values determined by the scanned bitmask may be used to define one or more joints in a skeletal model. The one or more joints are used to define one or more bones that correspond to a body part of a human.

One or more joints may be adjusted until the joints are within a range of typical distances between a joint and a body part of a human to generate a more accurate skeletal model. The model may further be adjusted based on, for example, a height associated with the human target.

At step 610, the model is tracked by updating the person's location several times per second. As the user moves in the physical space, information from the depth camera system is used to adjust the skeletal model such that the skeletal model represents a person. In particular, one or more forces may be applied to one or more force-receiving aspects of the skeletal model to adjust the skeletal model into a pose that more closely corresponds to the pose of the human target in physical space.

Generally, any known technique for tracking movements of a person can be used.

FIG. 7A depicts an example method for updating a hand location as set forth in step 504 of FIG. 5. Step 700 includes performing smoothing on an initial estimate of a hand location to provide a smoothed estimate of the location. Beginning with the raw input provided by an external tracking system, this step creates a smoothed version of the hand guess to dampen the effects of minor instability or jitter in the tracking system. This can be accomplished using an interpolation-based tether technique which minimizes perceptual latency. See FIGS. 7A and 7B for further details. Step 702 includes identifying a volume in the field of view based on the current estimate, where the volume is centered at the current estimate, or otherwise positioned based on the current estimate. See, e.g., FIG. 10. The volume can be a 3-D volume such as a rectangular volume, including a cube, or a spherical volume. The current estimate acts as the center of a small averaging volume in the high resolution depth image. Step 704 includes searching the volume to identify locations of edges of the hand. Taking a local average from the depth map ensures that while the hand guess from the tracking system may be jittery, so long as the depth image remains moderately stable, the resulting hand point will be stable. Step 706 includes taking an average of the locations to provide a new estimate of the hand location. The average location can be a representative point of the edge surfaces of the hand. Step 708 includes performing smoothing of the new estimate of the hand location, similar to the procedure of step 700. The smoothed value of step 708 is an example of a value derived from the new estimate of the location in step 706.

Since some amount of noise is inherent in the depth image due to the camera sensor, or operating conditions may dramatically increase the amount of noise in the depth image, a further smoothing process may be desirable to further stabilize the hand position. This can be done using a similar interpolation-based tethering technique as described above which smoothes out any small noise resulting from the local averaging.

Note that the steps provided in this and other flowcharts are not all required and the order specified can be varied as well in many cases.

FIG. 7B depicts an example method for performing smoothing as set forth in step 700 of FIG. 7A. Step 710 includes determining a difference, $\Delta$, between the initial estimate of the hand position at a current time, e.g., for a current frame of depth data from the motion tracking system, and a location estimate of the hand position at a prior point in time, such as at the previous frame. For example, the initial estimate may be expressed by the coordinates $(x(t_i), y(t_i), z(t_i))$ and the prior estimate may be expressed by the coordinates $(x(t_i-1), y(t_i-1), z(t_i-1))$, where i is a frame index. The difference can be expressed as a magnitude or a vector, which indicates magnitude and direction. Decision step 712 determines if $\Delta$ is less than a threshold, T. T can be set based on factors such as an expected range of movement of the hand, frame to frame, human perception capabilities, the size and/or resolution of the display and the nature of the movement on the display which is provided by the application based on the hand movement as a control input. Generally, a movement which is less than T is considered to be a relatively small movement such that a smoothing process can be applied which imposes some latency which will be acceptable to the user. A movement which is not less than T is considered to be a relatively large movement such that a smoothing process should not be applied, to avoid imposing a noticeable latency, or a smoothing process can be applied which imposes some latency which will be no more than mildly apparent to the user.

It is possible to adjust T to the environment of the motion capture system. For example, when a relatively large display is used, it may be appropriate to use a smaller value of T, because a given amount of latency will be more apparent to the user. The use of one value of T in a given situation provides two operating regimes based on whether $\Delta<T$ or $\Delta \geq T$. It is also possible to use two or more values of T so that three or more operating regimes are defined, and a latency can be tailored to each regime. For example, with T2>T1, regimes are provided for $\Delta<T1$, $T1 \leq \Delta<T2$ and $T2 \leq \Delta$.

If $\Delta<T$ at decision step 712, step 714 includes providing a current estimate of the hand position by applying a latency to the initial estimate, so that the current estimate lags the initial estimate. See FIG. 9A for further details. If $\Delta \geq T$ at decision step 712, step 716 includes providing the current estimate of the hand position by applying a smaller latency to the initial estimate (smaller than in step 714), or by applying no latency, so that the current estimate is substantially same as the initial estimate. Substantially the same may refer to equal values, within a round off or truncation error. See FIG. 9B for further details. In step 716, the latency imposed on the initial estimate to provide the current estimate is less than the latency imposed at step 714, when the difference is less than the threshold.

FIG. 7C depicts another example method for performing smoothing as set forth in step 700 of FIG. 7A. Steps 720 and 722 are the same as steps 710 and 72, respectively, of FIG. 7B. If $\Delta<T$ at decision step 722, step 724 includes providing an interpolation value Interp.$=\Delta/T$. Interp. will range between 0 and 1 as $\Delta$ ranges between 0 and T. Step 726 includes providing the current estimate from the relationship: initial estimate+($\Delta \times$Interp.), which can be expressed as initial estimate+$\Delta^2/T$. Essentially, the current estimate can be a non-linear function of $\Delta$. In this example, $\Delta$ is squared, or raised to the power of 2. Generally, $\Delta$ can be raised to a power which is greater than 1, such as $\Delta^{1.5}$. Many variations are possible. If $\Delta \geq T$ at decision step 722, step 728 includes providing the current estimate of the hand position as substantially the same as the initial estimate. Thus, when the difference is less than the threshold, the latency imposed on the initial estimate varies non-linearly so that the latency is greater when the difference is smaller, and the latency is smaller when the difference is greater. Also, the latency approaches zero as the difference approaches the threshold. This can be seen, e.g., by noting that values of $\Delta=0.0, 0.1, 0.3, 0.9, 1.0$ map to values of $\Delta^2/T=0.0, 0.01, 0.09, 0.81, 1.0$, respectively.

In this interpolation-based tether technique, a trailing point is created that follows the raw input point. The position of the trailing point is updated in a manner that is analogous to an elastic tether attached to the raw input such as the initial estimate. The trailing point moves toward the raw input in proportion to its distance from the raw input. If the raw input is far from the trailing point, the trailing point moves quickly toward the raw input, accommodating fast movements. If the raw input is close to the trailing point, the trailing point moves slowly toward the raw input, smoothing out small jittery movements. One embodiment of this tethering technique is using linear interpolation between the raw input point and trailing point. The interpolation value is equal to the distance between the raw input and trailing point divided by a fixed maximum distance, T. During high velocity movement of the hand, the raw input moves away from the trailing point, causing the interpolation value to approach one, resulting in a computed interpolated point to be near the raw input. During low velocity movement, the interpolation is near zero, resulting in a fairly stationary computer result. This approach minimizes the perceived latency during fast movements while maintaining a strong smoothing effect when moving slowly.

FIG. 7D depicts an example method for updating a hand location as set forth in step 504 of FIG. 5. This is a more sophisticated embodiment that is capable of detecting and correcting large temporary errors in the tracking system using a search method that attempts to locate the hands by analyzing the depth map. The hand guesses provided by the external tracking system are only used to reset the search algorithm in scenarios where the more sophisticated embodiment is uncertain.

Step 730 includes identifying a set of reference points in a 3-D skeletal model. The reference points can include, e.g., the shoulders, head, elbow, or other points on the upper torso, such as a line between the shoulders and a centerline of the upper torso. These are reference points which can assist in determining a location of the hands. Step 732 includes stabilizing the reference points. For instance, this can include determining if a reference point is occluded by another body part, as discussed in connection with FIG. 7E. This step creates a set of stabilized upper body points that can be used as reference points to begin the search. It can involve finding a stabilized head location, shoulder location, and basic body orientation. Guesses for each of these joints maybe provided by the external tracking system. Heuristics can be used to either smooth or ignore guesses from the tracking system. In cases where the arms occlude the head and/or shoulders, a tracking guess may be very unstable or unreliable. In such cases, occlusions can be detected, e.g., by measuring the proximity of the arm joints to the upper body joints in a projected camera image. If the arm joints are close to the upper body joints, as defined by a threshold distance which is based on experimentation or testing, an occlusion condition is likely to occur. Additionally, the strength of smoothing may not be uniform along each axis. For example, instability along the vertical axis may be much higher than the lateral or forward axis. A combination of these techniques can be used to generate stable upper body points.

Moreover, in scenarios where it is known that the user is likely to be facing toward the camera with a line between the shoulder blades largely perpendicular to the camera axis (the z-axis), it may be useful to force this orientation constraint for the sake of added stability. The shoulder blade vector is defined as a perpendicular to the vector extending from the shoulder center to the camera center.

Step 734 includes defining at least one vector starting from a reference point and extending to the hand location which was determined from the prior time point, e.g., at time ti−1. See FIG. 11A for further details. Step 736 includes traversing the at least one vector, searching for an arm extremity. This includes scoring candidate locations based on a distance relative to the at least one vector, as discussed further in connection with FIG. 11C. Once stable reference points such as the shoulders have been found in step 732, arm search vectors can be defined from each shoulder to each previous hand location. If previous hand locations are not available, we can use the raw hand guess provided by the tracking. The arm search vectors define the general direction the hands are relative to the shoulders. Frame to frame, the hands are likely to be relatively close to their previous position, so that the hands can be tracked by incrementally updating the search vector and looking for the best hand extremity candidate along the search vector. The extremity candidates along the search vector can be scored according to their distance along the vector minus their perpendicular distance to the vector. This favors points that are farther in the direction of the search vector, but penalizes candidates that drift far off to the side. A maximum arm length is also used to limit the distance of the search. When the search vectors produce an extremity result that is too close to the body or otherwise deemed poor, the extremities can be set to the raw hand guesses provided by the external tracking system.

After the final extremity guess has been selected, a local average of the high resolution depth map can be taken to smooth out the hand location described above. Similarly, it may be desirable to perform a final interpolation-based tether smoothing to further reduce the noise in the hand position (step 744). The smoothed value of step 744 is an example of a value derived from the new estimate of the location in step 742.

Steps 738, 740, 742 and 744 can be the same as steps 702, 704, 706 and 708, respectively, in FIG. 7A.

A method of only using the external tracking guess as a reset point when the search method fails make the technique robust to temporary errors in the external tracking system and vice versa. The technique only fails to provide a reasonable hand point when both methods of tracking the hand locations fail simultaneously. This approach could be extended to include a third or fourth method of hand tracking, reducing the failure conditions further, given a management system that can properly choose or combine the outputs of multiple tracking processes.

FIG. 7E depicts an example method for stabilizing reference points of a model as set forth in step 732 of FIG. 7D. Step 750 includes determining if a reference point in the body is occluded. See, e.g., FIG. 12A. For example, at step 752, this can include measuring a proximity of at least one arm joint, e.g., elbow or wrist, to at least one upper body position, e.g., the shoulder, head, or other points on the upper torso, including a line between the shoulder blades and a centerline of the upper torso. At step 754, if it is determined that the reference point is occluded, its position is determined based on at least one other reference point in the 3-D skeletal model which is not occluded. For instance, if one shoulder location is known relative to the centerline of the upper torso, the other shoulder location can be determined.

Figure 8:
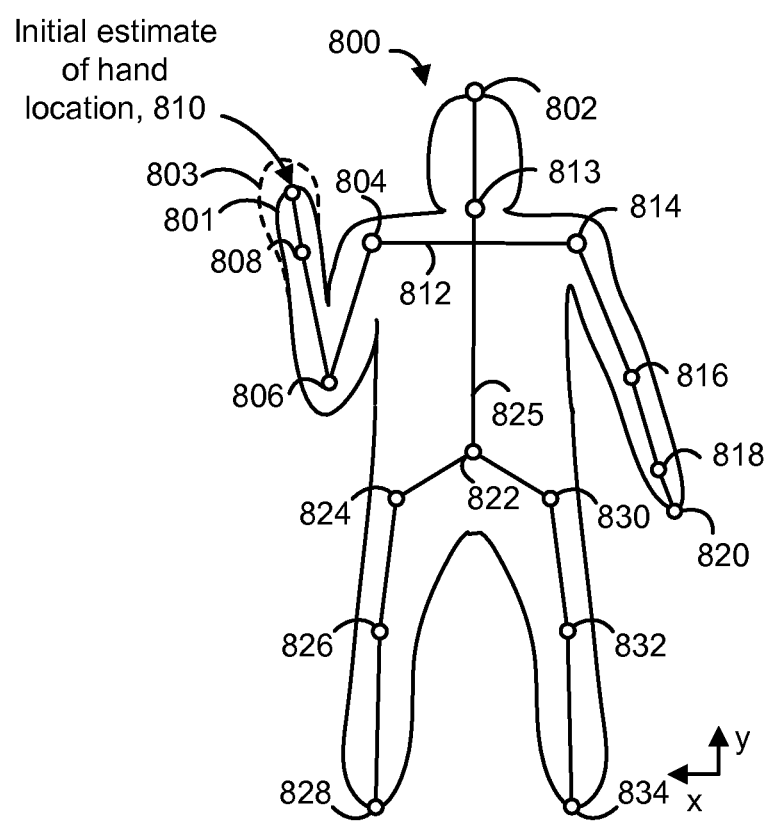
FIG. 8 depicts an example model of a user as set forth in step 608 of FIG. 6.

FIG. 8 depicts an example model of a user as set forth in step 608 of FIG. 6. The model 800 is facing the depth camera, in the −z direction, so that the cross-section shown is in the x-y plane. Note the vertical y-axis and the lateral x-axis. A similar notation is provided in other figures. The model includes a number of reference points, such as the top of the head 802, bottom of the head or chin 813, right shoulder 804, right elbow 806, right wrist 808 and right hand 810, represented by a fingertip area, for instance. The right and left side is defined from the user's perspective, facing the camera. This can be the initial estimate of the hand location. The hand position 810 is based on a determined edge region 801 of the hand. However, as mentioned, due to noise and other factors, there can be some error in this initial location determination. An area between the edge regions 801 and 803 represents a region of uncertainty in the hand location. Another approach is to represent the hand position by a central point of the hand. The model also includes a left shoulder 814, left elbow 816, left wrist 818 and left hand 820. A waist region 822 is also depicted, along with a right hip 824, right knew 826, right foot 828, left hip 830, left knee 832 and left foot 834. A shoulder line 812 is a line, typically horizontal, between the shoulders 804 and 814. An upper torso centerline 825, which extends between the points 822 and 813, for example, is also depicted.

Figure 9A:
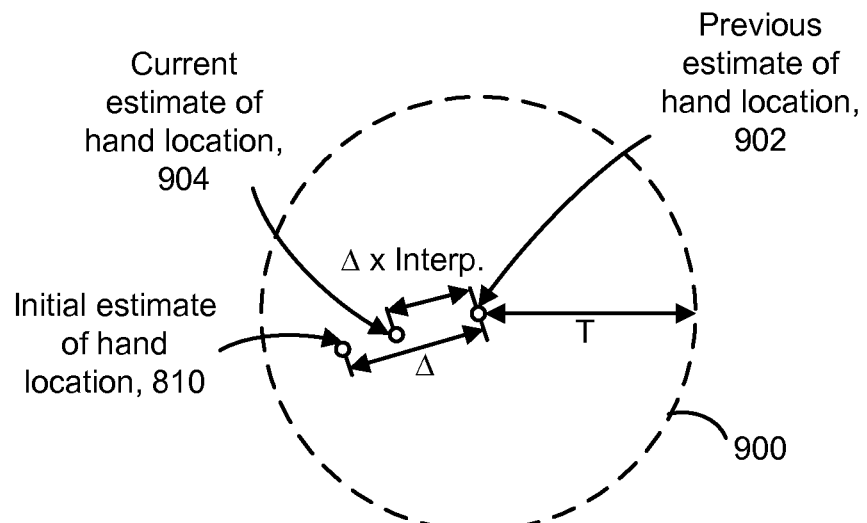
FIG. 9A depicts an example technique for performing smoothing as set forth in step 700 of FIG. 7A, when a difference between an initial estimate and a prior estimate is less than a threshold.

FIG. 9A depicts an example technique for performing smoothing as set forth in step 700 of FIG. 7A, when a difference between an initial estimate and a prior estimate is less than a threshold. Here, point 902 represents a previous estimate of the hand location, e.g., at time ti−1. Point 902 is at the center of a volume which is a sphere, in this example, of radius T, where T is a threshold, as discussed previously. Point 810 (consistent with FIG. 8) represents an initial estimate of a hand location at the current time, time ti. Δ is the difference between points 810 and 902. Δ can be a vector in a direction from point 902 to point 810, for instance. Point 904 represents a current estimate of the hand location, and represents the point 810 with a latency imposed. Point 904 is a distance of $\Delta^2/T$ from point 902, and is along a vector from point 902 to 810.

Figure 9B:
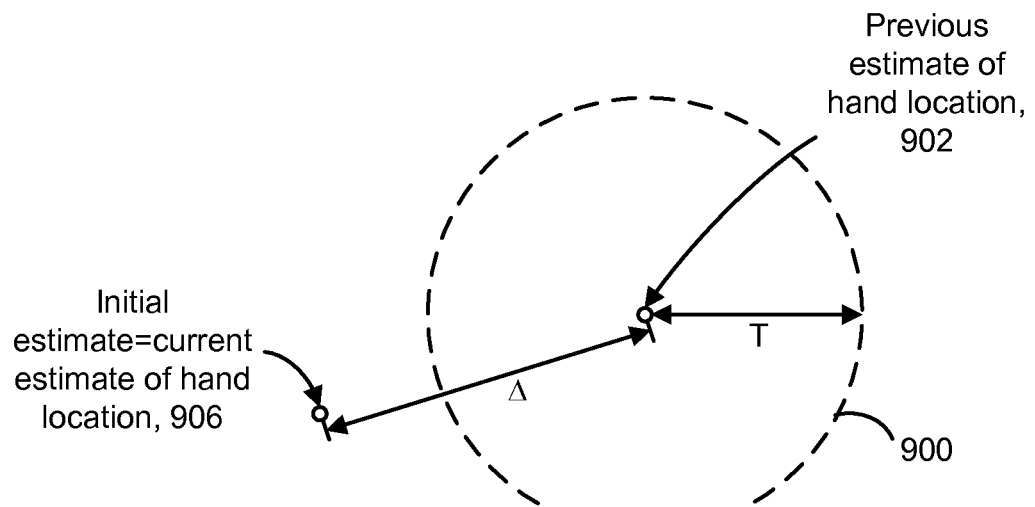
FIG. 9B depicts an example technique for performing smoothing as set forth in step 700 of FIG. 7A, when a difference between an initial estimate and a prior estimate is greater than or equal to a threshold.

FIG. 9B depicts an example technique for performing smoothing as set forth in step 700 of FIG. 7A, when a difference between an initial estimate and a prior estimate is greater than or equal to a threshold. Point 902 and the volume 900 are the same as in FIG. 9A. Point 906 represents an alternative initial estimate of a hand location at the current time, time ti. Note that the point 906 is outside the volume, so that little or no latency will be imposed. Δ is the difference between points 810 and 906. Δ can be a vector in a direction from point 902 to point 906, for instance. Point 908 represents a current estimate of the hand location, and represents the point 906 with a smaller latency imposed than in FIG. 9A. It is also possible for the current estimate to be set to substantially the initial estimate at point 906. The magnitude of the latency is proportional to the distance between points 810 and 904 in FIG. 9A, and between points 906 and 908 in FIG. 9B.

Figure 10:
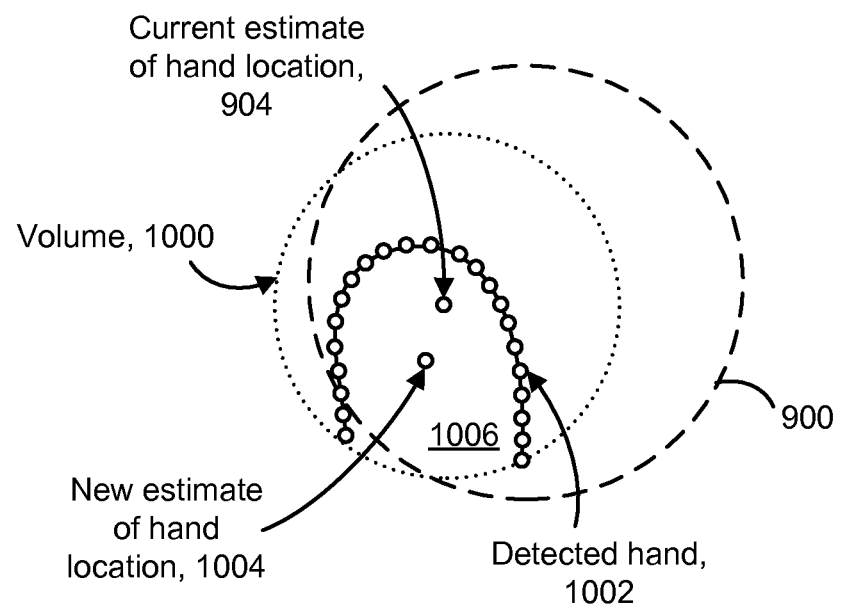
FIG. 10 depicts an example technique of providing a new estimate of a hand location as set forth in steps 704 and 706 of FIG. 7A.

FIG. 10 depicts an example technique of providing a new estimate of a hand location as set forth in steps 704 and 706 of FIG. 7A. The volume 900 and the point 904 are consistent with FIG. 9A. Once the current estimate of point 904 is obtained, an additional volume 1000, such as a sphere, rectangular volume or cube, can be defined, in which point 904 is at the center. This volume is searched to detect the presence or absence of the hand. That is, for each point in the volume, a determination is made as to whether the point represents free space or some part of the model of the body. Edges can thus be detected in 3-D by detecting transitions between a part of the model and free space. Example points on the detected edge 1002 are represented by circles. The points can extend in 3-D around a body portion 1006 which is presumed to be the hand. A depth average of the body portion 1006 can be taken based on the edge region to obtain a point 1004 which is a new estimate of the hand location. The point 1004 can be an average of all edge region points.

Figure 11A:
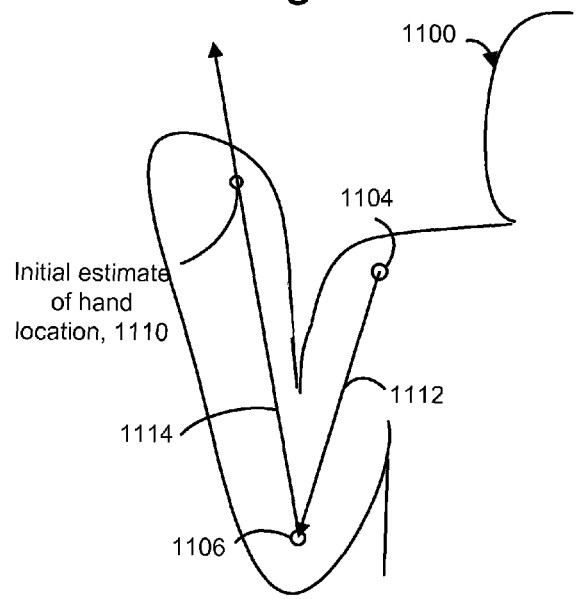
FIG. 11A depicts an example of defining at least one vector as set forth in step 734 of FIG. 7D.

FIG. 11A depicts an example of defining at least one vector as set forth in step 734 of FIG. 7D. A 3-D model 1100 depicts a portion of a person including the right shoulder joint 1104, the right elbow joint 1106, and a point 1110 which is an initial estimate of the hand position. An outline of the hand is depicted as extending beyond the point 1110, and showing the hand as being larger than in reality, to illustrate that the point 1110 has some inaccuracy in representing the extreme point of the hand. Such an inaccuracy can be caused by noise, the type of hand detection algorithm used, and other factors as discussed. A technique for improving the accuracy of the hand position involves defining one or more vectors such as vectors 1112 and 1114 which extends from the shoulder to the point 1110, which is the initial estimate of the hand position. In this example, the arm is bent so that the forearm, represented by the vector 1114, extends in a substantially different direction than the upper arm, represented by the vector 1112. The use of the forearm vector 1114 would be sufficient in this example. In other cases, the arm may be relatively straight in which case a single vector could be used, such as from the shoulder joint to the initial estimate of the hand position. In another example, a foot position is determined using a vector along the leg, e.g., from the hip to the foot, or from the knee to the foot.

This concept takes advantage of one or more reference points on the body, such as a shoulder or elbow joint, in refining the estimate of the hand position.

Figure 11B:
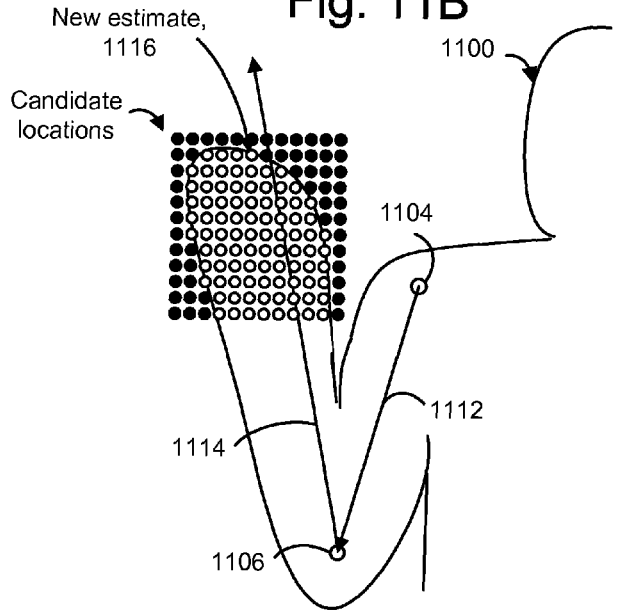
FIG. 11B depicts an example of searching for an arm extremity as set forth in step 736 of FIG. 7D.

FIG. 11B depicts an example of searching for an arm extremity as set forth in step 736 of FIG. 7D. The one or more vectors defined in FIG. 11A are traversed to identify candidate locations for the hand position, and to define a score for each candidate position. Each circle represents an evaluated hand position, as a simplified example.

Each circle represents an evaluated hand position. The evaluated hand positions can be constrained to being within a certain distance which is offset, perpendicularly, from the one or more vectors, such as based on an expected range of arm thicknesses, and a certain distance which extends beyond the initial estimate of the hand position, in the direction of the at least one vector, such as based on an expected range of arm lengths. Each evaluated hand position is evaluated to determine whether it is part of the 3-D model or not, e.g., whether there is depth map data for the point or not.

The open or white circles represent evaluated hand positions which are part of the 3-D model, and are therefore candidate hand positions. The black circles represent evaluated hand positions which are not part of the 3-D model. A point 1116 is determined to be the candidate hand position with the highest score, in this example, and therefore becomes the new estimate of the hand position.

Figure 11C:
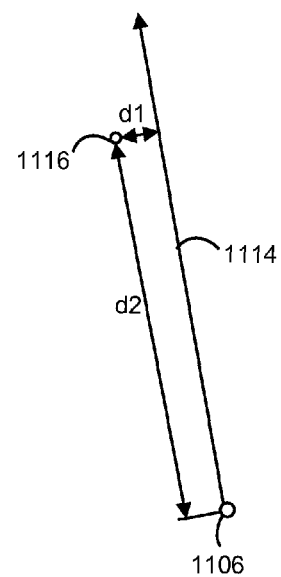
FIG. 11C depicts an example of scoring candidate locations as set forth in step 736 of FIG. 7D.

FIG. 11C depicts an example of scoring candidate locations as set forth in step 736 of FIG. 7D. Each candidate hand location can be scored based on its distance along the at least one vector and its distance perpendicularly from the at least one vector. In one approach, the score is equal to the distance along the at least one vector, minus the perpendicular distance from the at least one vector. For instance, in traversing the vector 1114, the score for the point 1116 is d2−d1, where d2 is the distance along the vector 1114, i.e., the distance from the elbow joint 1106, and d1 is the distance perpendicular to the vector 1114. This approach favors the candidate point which is furthest along the vector and closest to the vector. Other scoring techniques may be used as well, such as a technique which provides different weights for the distance along the vector compared to the distance perpendicular to the vector. The location with the highest score can be considered the most probable location of the hand.

Figure 12A:
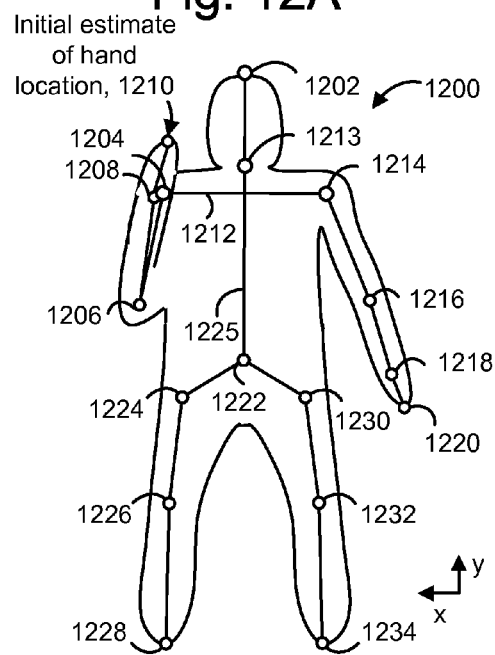
FIG. 12A depicts an example front view of a model of a user in which a reference point in the body is occluded, as set forth in step 750 of FIG. 7E.

FIG. 12A depicts an example front view of a model of a user in which a reference point in the body is occluded, as set forth in step 750 of FIG. 7E. In some situations, a reference point in the model of the body which could be used for refining the hand position may be occluded. For example, the shoulder as a reference point may be occluded by the user's raised arm, which is the case in this example.

The model 1200 is facing the depth camera, in the −z direction, so that the cross-section shown is in the x-y plane. The model includes reference points, such as the top of the head 1202, bottom of the head or chin 1213, right shoulder 1204, right elbow 1206, right wrist 1208 and right hand 1210. Point 1210 can be the initial estimate of the hand location. The model also includes a left shoulder 1214, left elbow 1216, left wrist 1218 and left hand 1220. A waist region 1222 is also depicted, along with a right hip 1224, right knew 1226, right foot 1228, left hip 1230, left knee 1232 and left foot 1234. A shoulder line 1212 is a line, typically horizontal, between the shoulders 1204 and 1214. An upper torso centerline 1225, which extends between the points 1222 and 1213, for example, is also depicted. As can be seen, the shoulder 1204 is occluded by the user's raised arm.

When the shoulder 1204 is used as a reference point to define one or more vectors for refining the hand position, such as discussed in connection with FIGS. 11A-11C, the fact that the shoulder point 1204 is occluded can result in difficulty in accurately defining its location. In this case, a stabilization process for the shoulder point involves using other, non-occluded reference positions in the body to confirm and/or define the shoulder point location, as discussed further in connection with FIGS. 12C and 12D.

Figure 12C:
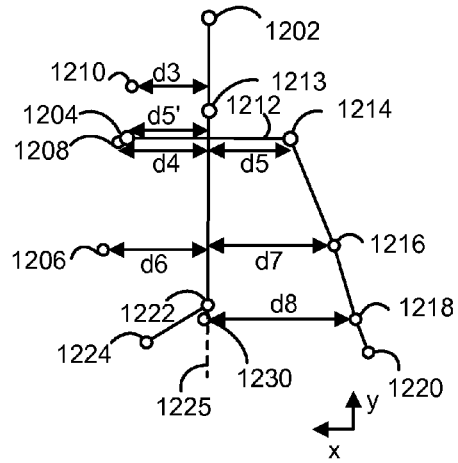
FIG. 12C depicts a projected camera image view of the model of FIG. 12A.
Figure 12B:
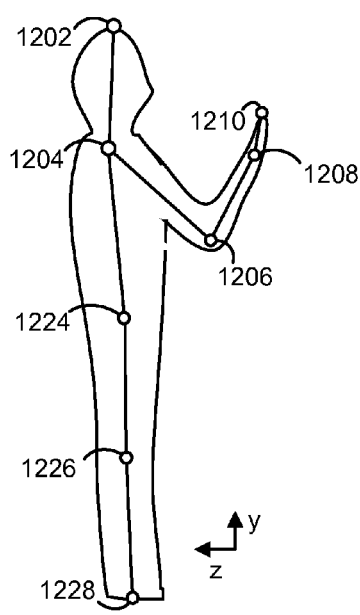
FIG. 12B depicts a profile view of the model of FIG. 12A.

FIG. 12B depicts a profile view of the model of FIG. 12A. Here, it can be seen that the user's hand is raised up in front of the body so that a portion of the body is occluded from the depth camera which faces in the z direction. Note that the raising of the right or left arm in front of the user is a common posture which is used in gesturing to provide a control input to an application. However, other postures can result in occlusions as well.

FIG. 12C depicts a projected camera image view of the model of FIG. 12A. A projected camera image view is a 2-D view of the 3-D body model, showing the relative locations of reference positions of the body in a plane. The reference positions of FIG. 12C correspond to the like-numbered positions in FIG. 12A, but the outline of the body model is removed for clarity. Further, a number of distances from the upper torso centerline 1225 are depicted as an example, namely: d3 (right hand 1210), d4 (right wrist 1208), d5' (right shoulder 1204—same as d5), d5 (left shoulder 1214), d6 (right elbow 1206), d7 (left elbow 1216) and d8 (left wrist 1218).

The location of one or more non-occluded points in the 3-D model can be used to determine a position of the shoulder point 1204. For example, the shoulder point 1204 can be assumed to be the same distance from the centerline 1225 as the shoulder point 1214. In some cases, a line 1212 which extends from the shoulder point 1214 to the centerline 1225 can be defined, so that the shoulder point 1204 is further refined as being on the line 1212.

Further, the likelihood that the shoulder point 1204 is occluded can be determined in different ways, such as by determining the position of the right arm based on positions of the wrist 1208 and the elbow 1206. In some cases, the absolute distance from the center line to the wrist 1208 or elbow 1206 can indicate an occlusion. Additionally, the distance from the center line to the opposing side wrist 1218 or elbow 1216 can be compared to the distance from the center line to the wrist 1208 or elbow 1206. Also, the distance from the center line to the wrist 1208 or elbow 1206 can be compared to the approximate distance from the shoulder 1214 to the centerline 1225, i.e., d5. Various other heuristics and metrics can be used as well in determining whether an occlusion condition is present, and in determining a location of an occluded point. An orientation of the model can also be used in determining whether an occlusion condition is present, and in determining a location of an occluded point.

Figure 12D:
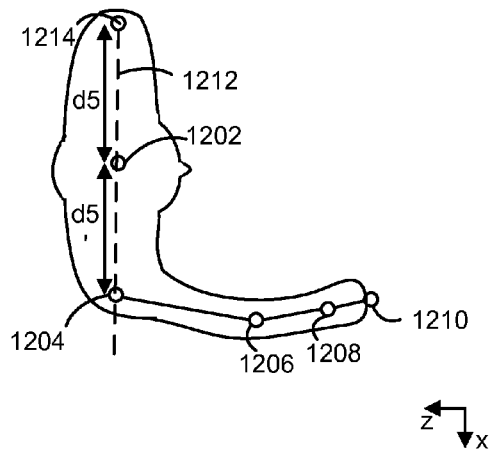
FIG. 12D depicts an overhead view of the 3-D model of FIG. 12A.

FIG. 12D depicts an overhead view of the 3-D model of FIG. 12A. The distance d5 from the user's left shoulder 1214 to the body centerline, which can pass through the top of head point 1202, and the line 1212 starting from the user's left shoulder 1214 and passing through the centerline, can be used to determine a location of the right shoulder 1204 by assuming it is also the distance d5 (d5'=d5) from the centerline, along the line 1225. In this example, the user is facing the camera directly, in the −z direction. However, the techniques described can be used if the user's body is in another orientation as well, such as rotated with respect to the −z axis.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

I claim:

1. Tangible computer readable storage device having computer readable software embodied thereon for programming a processor to perform a method for tracking user movement in a motion capture system, the method comprising:
   tracking a body in a field of view of the motion capture system, including obtaining a 3-D depth image and determining a 3-D skeletal model of the body;
   for one point in time, identifying a location of a hand of the 3-D skeletal model in the field of view; and
   for a next point in time:
      identifying a reference point of the 3-D skeletal model;
      defining at least one vector from the reference point in the next point in time to the location of the hand in the one point in time;
      traversing the at least one vector to look for a most probable location of the hand in the next point in time, including scoring candidate locations which are part of the 3-D skeletal model based on their distance along the at least one vector and their distance perpendicularly from the at least one vector;
      based on the most probable location of the hand, defining a volume in the field of view;
      searching the 3-D depth image in the volume to determine a location of the hand in the field of view; and
      providing to an application a control input which represents the hand in the field of view based on the determined location of the hand, or a value derived from the determined location of the hand.

2. The tangible computer readable storage device of claim 1, wherein:
   the scoring candidate locations includes providing a score indicating a more probable location in proportion to the distance along the at least one vector being greater, and in proportion to the distance perpendicularly from the at least one vector being lower.

3. The tangible computer readable storage device of claim 1, wherein:
   the searching includes identifying locations of edges of the hand in the volume and determining an average of the locations of the edges.

4. The tangible computer readable storage device of claim 1, wherein:
   the volume in the field of view is centered at an estimate of the location of the hand in the field of view.

5. The tangible computer readable storage device of claim 1, wherein:
   the reference point of the 3-D skeletal model is a shoulder.

6. The tangible computer readable storage device of claim 1, wherein:
the reference point of the 3-D skeletal model undergoes temporal smoothing before the at least one vector is defined.

7. The tangible computer readable storage device of claim 1, wherein:
the reference point of the 3-D skeletal model is identified based on a set of points which are identified from the 3-D skeletal model, the set of points identify at least both shoulders of the 3-D skeletal model.

8. The tangible computer readable storage device of claim 1, wherein:
the reference point of the 3-D skeletal model is identified based on a set of points which are identified from the 3-D skeletal model; and
the method further comprises determining when at least one point of the set of points is potentially occluded, and, responsive to determining that the at least one point of the set of points is potentially occluded, determining a location of the at least one point based on another point of the 3-D skeletal model.

9. The tangible computer readable storage device of claim 8, wherein:
the determining when the at least one point of the set of points is potentially occluded comprises measuring a proximity of an arm joint to an upper body joint in the 3-D skeletal model in a projected camera image.

10. A processor-implemented method for tracking user movement in a motion capture system, comprising the processor-implemented steps of:
tracking a body in a field of view of the motion capture system, including obtaining a 3-D depth image and determining a 3-D skeletal model of the body;
for one point in time, identifying a location of a hand of the 3-D skeletal model in the field of view; and
for a next point in time:
identifying a reference point of the 3-D skeletal model;
defining at least one vector from the reference point in the next point in time to the location of the hand in the one point in time;
traversing the at least one vector to look for a most probable location of the hand in the next point in time, including scoring candidate locations which are part of the 3-D skeletal model based on their distance along the at least one vector and their distance perpendicularly from the at least one vector;
based on the most probable location of the hand, defining a volume in the field of view;
searching the 3-D depth image in the volume to determine a location of the hand in the field of view; and
providing to an application a control input which represents the hand in the field of view based on the determined location of the hand, or a value derived from the determined location of the hand.

11. The processor-implemented method of claim 10, wherein:
the scoring candidate locations includes providing a score indicating a more probable location in proportion to the distance along the at least one vector being greater, and in proportion to the distance perpendicularly from the at least one vector being lower.

12. The processor-implemented method of claim 10, wherein:
the reference point of the 3-D skeletal model undergoes temporal smoothing before the at least one vector is defined.

13. The processor-implemented method of claim 10, wherein:
the reference point of the 3-D skeletal model is identified based on a set of points which are identified from the 3-D skeletal model, the set of points identify at least both shoulders of the 3-D skeletal model.

14. The processor-implemented method of claim 10, wherein:
the reference point of the 3-D skeletal model is identified based on a set of points which are identified from the 3-D skeletal model; and
the method further comprises determining when at least one point of the set of points is potentially occluded, and, responsive to determining that the at least one point of the set of points is potentially occluded, determining a location of the at least one point based on another point of the 3-D skeletal model.

15. The processor-implemented method of claim 14, wherein:
the determining when the at least one point of the set of points is potentially occluded comprises measuring a proximity of an arm joint to an upper body joint in the 3-D skeletal model in a projected camera image.

16. A motion capture system, comprising:
a depth camera system having a field of view; and
a processor in communication with the depth camera system, the processor receives images of the field of view and executes instructions to track user movement in the field of view, the instructions cause the processor to track a body in a field of view, including obtaining a 3-D depth image and determining a 3-D skeletal model of the body, for one point in time, identify a location of a hand of the 3-D skeletal model in the field of view, and for a next point in time: identify a reference point of the 3-D skeletal model, define at least one vector from the reference point in the next point in time to the location of the hand in the one point in time, traverse the at least one vector to look for a most probable location of the hand in the next point in time, including providing a score for candidate locations which are part of the 3-D skeletal model based on their distance along the at least one vector and their distance perpendicularly from the at least one vector, based on the most probable location of the hand, define a volume in the field of view, search the 3-D depth image in the volume to determine a location of the hand in the field of view, and provide to an application a control input which represents the hand in the field of view based on the determined location of the hand, or a value derived from the determined location of the hand.

17. The motion capture system of claim 16, wherein:
the providing a score for the candidate locations includes providing a score indicating a more probable location in proportion to the distance along the at least one vector being greater, and in proportion to the distance perpendicularly from the at least one vector being lower.

18. The motion capture system of claim 16, wherein:
the search includes identifying locations of edges of the hand in the volume and determining an average of the locations of the edges.

19. The motion capture system of claim 16, wherein:
the volume in the field of view is centered at an estimate of the location of the hand in the field of view.

20. The motion capture system of claim 16, wherein:
the reference point of the 3-D skeletal model is a shoulder.

* * * * *